US005408090A

United States Patent [19]

Craddock

[11] Patent Number: 5,408,090

[45] Date of Patent: Apr. 18, 1995

[54] APPARATUS FOR COUNTING CAN ENDS OR THE LIKE

[75] Inventor: Paul Craddock, Worcester, England

[73] Assignee: Sencon (UK) Ltd., United Kingdom

[21] Appl. No.: 57,130

[22] Filed: May 3, 1993

[30] Foreign Application Priority Data

May 8, 1992 [GB] United Kingdom ................. 9209992

[51] Int. Cl.[6] ................................................ G01V 9/04

[52] U.S. Cl. ............................. 250/222.1; 250/223 R; 377/6

[58] Field of Search ................ 250/221, 222.1, 223 R, 250/223 B, 561; 235/98 C, 132 R, 132 A; 377/6, 30

[56] References Cited

U.S. PATENT DOCUMENTS 3,692,985 9/1972 Kalman ............................ 235/98 C
3,964,041 6/1976 Hinds ............................. 250/223 R
4,027,155 5/1977 Rappaport ...................... 250/223 R
4,217,491 8/1980 Dufford, Jr. et al. ........... 235/98 C
4,450,352 5/1984 Olsson ............................ 250/223 R
4,694,474 9/1987 Dorman ................................. 377/6
4,778,986 10/1988 Lundberg et al. .............. 250/223 R
4,807,263 2/1989 Ohno et al. ...................... 250/222.2
5,139,339 8/1992 Courtney et al. .................. 250/561

FOREIGN PATENT DOCUMENTS 0299297 1/1989 European Pat. Off. .
0374799 6/1990 European Pat. Off. .
1580521 12/1980 United Kingdom .

*Primary Examiner*—David C. Nelms
*Assistant Examiner*—Stephone B. Allen
*Attorney, Agent, or Firm*—Emrich & Dithmar

[57] ABSTRACT

A method is provided for detecting a junction between adjacent can ends which are arranged in a stack. The method enables a selected number of can ends in the stack to be counted. The method comprises the steps of illuminating the peripheral edge regions of can ends in the stack with a signal emitted by a emitter inclined at an oblique angle to a line normal to the central axis of the stack and detecting reflected signals from the ends of the peripheral edge regions of the can ends. Oblique illumination provides alternating regions of the stack reflecting a relatively high and relatively low light intensity. Detection of the light intensity across the length of the stack enables a junction between adjacent can ends to be determined.

7 Claims, 4 Drawing Sheets

APPARATUS FOR COUNTING CAN ENDS OR THE LIKE

This invention relates to improvements in handling and/or counting apparatus and sensors for such apparatus, especially, but not exclusively, to improvements in end splitters adapted to separate a predetermined number of can ends from a stack of can ends.

The canning industry has had for many years now a problem in counting and separating a predetermined number of can ends from a continuously moving "snake" or "stack" of can ends. Up until now the industry has used mechanical sensors or feeler fingers to count can ends, or has caused the can ends to register with appropriate receiving spaces in a transmission member thereby enabling the number of can ends passing a point to be counted by monitoring the movement of the transmission member. One known form of transmission member is an auger which moves can ends along by rotating, monitoring the rotation of the auger giving an indication of the number of can ends passing a point. Another known can end splitter acknowledges the difficulties which its optical sensor has in counting accurately the number of can ends which pass and simply counts past the desired number plus a surplus to allow for inaccuracies. This is wasteful since the device is usually arranged to count past more than the number purported to be counted (the "bakers dozen" principle).

It is difficult to count can ends as they pass a point in a snake of can ends because they are close together, the conveyor system moving the can ends vibrates them (making them move forwards and backwards slightly), and the snake often moves at irregular speeds and may even stop temporarily, or even a part of it recoil backwards in front of the counter. Even when a desired number of can ends is counted the snake is still moving and it can be awkward to separate off the desired number accurately.

It is an aim of the present invention to provide a new can end, or other item, counter and/or handling apparatus, and/or a new sensor for such apparatus.

According to a first aspect of the invention we provide apparatus for counting and separating articles arranged in a row, stack, or snake, comprising a sensor, control means, and separation means; the sensor feeding signals to the control means indicative of the presence at a sensing region, or the passing by of an article past the sensing region, and the control means counting the articles as they pass the sensor until a predetermined number of articles have been counted, the control means detecting a division between two adjacent articles and controlling the separation means so as to introduce a separation member between two adjacent articles to divide or separate them, and the separation means separating the predetermined number of articles from the row, stack, or snake.

Preferably the row moves longitudinally past the sensing region. The separating means is preferably mounted on a longitudinally moveable member which is moveable under the control of the control means. Preferably the sensor is mounted on a longitudinally moveable sensor carrier which is moveable under the control under the control means. Most preferably the same longitudinally moveable member carries the separation means and the sensor.

The controller preferably controls first separation movement means and second separation movement means, the first separation movement means moving a counted number, or stick, of items of the snake away from the body of the snake after the separation means has been introduced between two adjacent items. Preferably the first separation movement means is a longitudinally moveable member which carries the separation means and/or the sensor.

Preferably the second separation movement means is provided in such a manner that the range of movement of the second separation movement means overlaps with the range of movement of the first separation movement means so as to enable the second separation movement means to move a stick of items further from the stack than they are moved by the first separation movement means.

A packaging or other handling or processing station may be provided downstream of the first and/or second separation movement means.

According to a second aspect of the invention we provide a method of separating articles in a row, stack, or snake, the method comprising sensing the junction between two adjacent articles, driving in a splitter to separate the two articles, moving the splitter (or other element introduced between said two adjacent articles) longitudinally of the snake so as to move a predetermined number of articles away from the main body of the snake.

The method preferably comprises moving the splitter longitudinally of the snake. Preferably the method comprises mounting a sensor and a splitter on the same moveable head.

The method preferably comprises moving a predetermined number of items away from the main body of the snake in two or more stages. When there are two stages they may comprise a first stage in which a first separation movement member moves the stick, and a second stage in which a second separation movement member moves the stick.

The splitter is preferably introduced between two adjacent articles whilst the snake is moving longitudinally.

According to a third aspect of the invention we provide a method of separating articles which are moving in a row, stack, or snake, comprising providing an unrestrained end of the snake, introducing a splitter into the moving body of the snake so as to divide apart two articles and so as to divide from the snake a stick of articles at the unrestrained end of the snake from the main body, and moving the stick away from the main body without stopping the movement of the main body.

According to a fourth aspect of the invention we provide a sensor having an emitter and a detector, the emitter and detector being angled relative to each other such that a signal emitted by the emitter and reflected by a surface to be detected is detected by the detector only if the surface is at a predetermined angle to the configuration of the emitter and detector (or within an allowable range of angles), a signal reflected from surfaces at other angles beyond the allowable range being undetected.

The emitter is preferably inclined relative to the detector at an angle of about 60 degrees, plus or minus 20 degrees, or plus or minus 10 degrees.

A sensor preferably includes a lens to cover and/or focus a reflected signal prior to its detection by the detector. The detector may be provided in a light guideway which acts to restrict the detecting angle of the detector. The guideway may comprise a column or tube.

Preferably the sensor comprises two detectors at different positions relative to the emitter, each detector providing its own output signal.

The two output signals can be compared to differentiate forward movement from backward movement.

According to a fifth aspect of the invention we provide a sensing system comprising a sensor in accordance with the fourth aspect of the invention and evaluation means adapted to evaluate signals from the detector.

The system also preferably includes a detecting station where articles to be detected are presented for detection. The system preferably includes a sensor having two detectors spaces such that their signals indicative of the presence of an object are in quadrature.

According to a sixth aspect of the invention we provide a method of detecting a junction between adjacent can ends, and/or a method of counting can ends in a stack, comprising illuminating peripheral edge regions of can ends in a stack with a signal from an emitter inclined at an oblique angle to a line normal to the central axis of the stack, and detecting a signal reflected along a direction inclined at an angle to the direction of illumination.

Preferably the line of detection is the line normal to the central axis.

According to a seventh aspect the invention consists in a method of detecting and counting the passage of can ends past a counting station comprising illuminating the can ends with a signal from an emitter, detecting reflected signals from the can ends with a plurality of detectors which receive signals which are out of phase, and processing the signals from the detectors so as to compare their relative characteristics so as thereby to differentiate between a can end moving forwards past the counting station and a can end moving backwards past the counting station.

Preferably two detector signals are received in quadrature.

Embodiments of the invention will now be described by way of example only with reference to the accompanying drawings of which:

Figure 1:
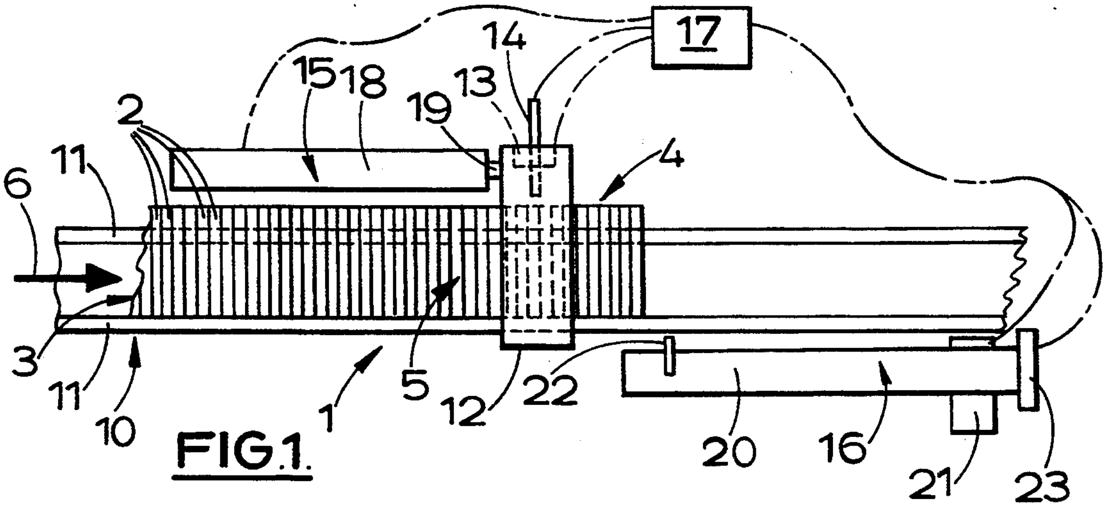
FIGS. 1 to 4 show schematically a can end splitter in accordance with the present invention.
Figure 2:
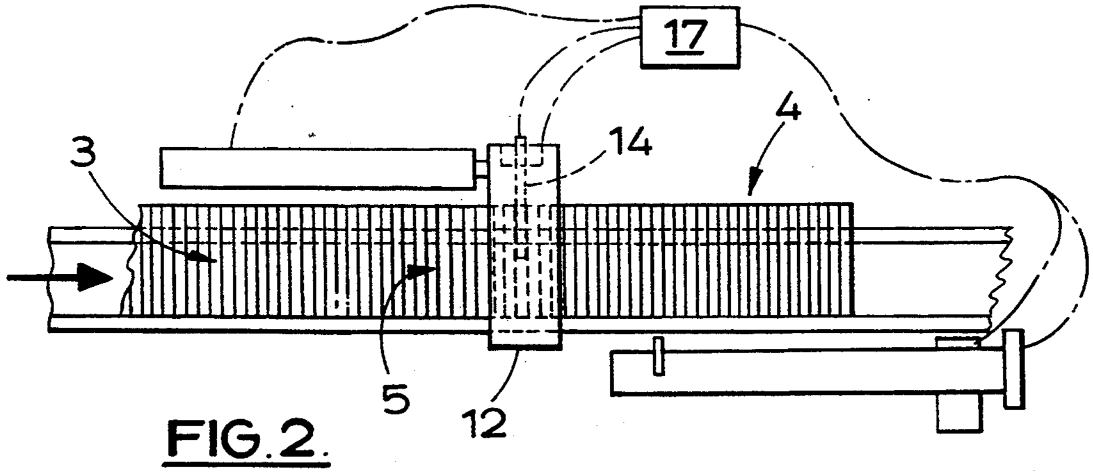
Figure 3:
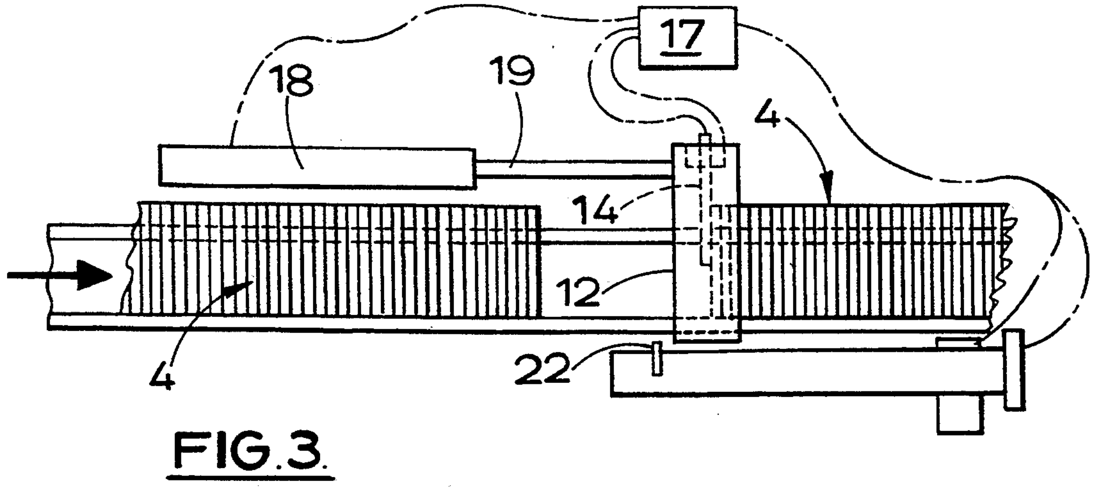
Figure 4:
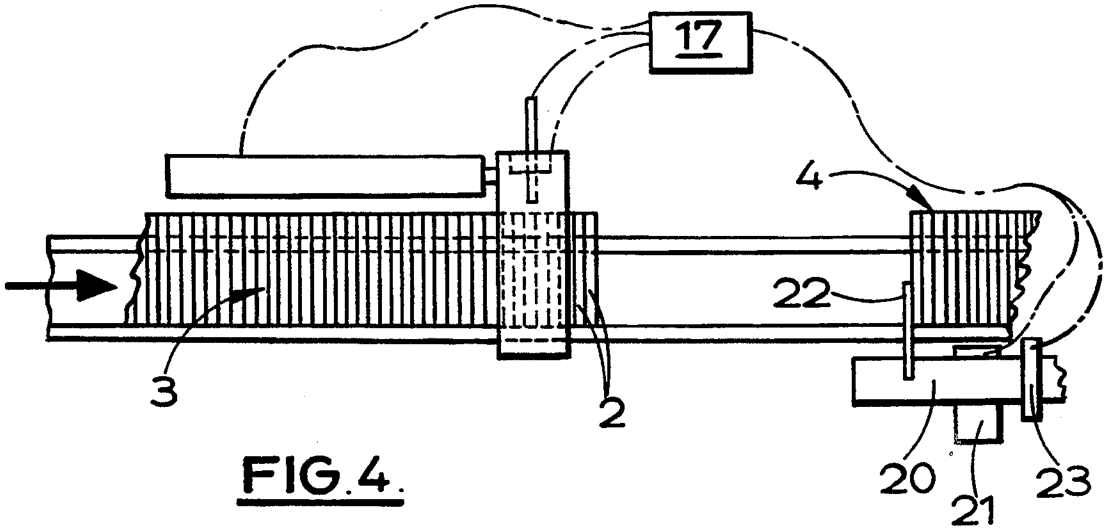

FIGS. 1 to 4 show a sequence of operations of end splitter apparatus 1 which receives can ends 2 fed to it in a continuous, or at times substantially continuous, snake 3 coming from a source (not shown). The apparatus 1 counts a predetermined number of can ends, say 500, and then splits a "stick" 4 of counted ends away from the main body 5 of the snake 3. The snake 3 is continuously moving longitudinally in the direction of arrow 6 as fresh can ends join it from the left as seen in the Figures. The can ends 2 are jostled around by vibration, and portions of the snake 3 can move relative to other portions of it, either forwards or backwards, since the can ends are simply nestled together, sometimes loosely, sometimes tightly, as the snake moves on. The can ends 2 are, for example, for subsequent incorporation in cans of drink and may have ring pulls or other can-opening formations provided in their circular generally flat faces.

The can end splitter apparatus comprises a longitudinally extending cradle or rod cage 10 formed by rods 11, a movable head 12 having a sensor unit 13 and a splitter knife 14, a head-moving piston and cylinder assembly 15, a stick-moving piston and cylinder assembly 16, and an electronic controller 17. The head-moving piston and cylinder assembly 15 comprises a cylinder 18 fixed to the rod cage 10 and a piston arm 19 movable relative to the cylinder 18 and attached to the head 12. The knife 14 is movable radially inwards so that it projects into the snake 3 so as to divide two adjacent can ends 2 and split off the stick 4. The movement of the knife 14 is controlled by a solenoid. The head 12 is guided for longitudinal movement by guide means (not shown).

The stick-moving piston and cylinder assembly 16 comprises an arm 20 movable relative to the rod cage 10, rotation means 21 adapted to rotate the arm 20 so as to bring a finger 22 of the arm into the longitudinal projection of the snake and stick, and longitudinal arm-moving means 23.

The operation of the piston 19, knife 14, rotation means 21, and arm-moving means 23 are under control of the controller 17. The sensor unit 13 has an infra red emitter and two infra red detectors (shown in FIG. 6 and described later) and feeds its signals to the controller 17.

The can ends pass under the sensor unit as the snake moves forward, the sensor unit 13 counting each can end. FIG. 1 shows this process. When the desired, and pre-entered, number of can ends has passed, the electronics of the controller looks at the signal from the sensor and waits for the sensing signals to indicate that the knife 14 is in line with the next "valley" between the rounded peripheral edges of adjacent can ends (see FIG. 8 described later). When the snake edges forward enough so that the next valley between adjacent can ends is detected the solenoid which operates the knife is energised at a high voltage, say 50 v, so as to make the knife 14 move radially inwards quickly. The solenoid is a 12 v solenoid which is initially operated briefly at a much higher than normally designed voltage in order to achieve a fast response. Appropriate capacitors to achieve this are provided. After an initial fast, high voltage, phase of operation the voltage to the solenoid is reduced to a lower holding voltage of, say, 12 v.

Thus the knife is quickly pushed between two adjacent can ends and the timing of the operation of the knife is such that it is controlled so as to hit the snake at the junction between adjacent can ends. This is the state shown in FIG. 2. The snake is still moving forwards and the head 12 may move with it, but we prefer instead to have the controller 17 operate the head-moving piston and cylinder assembly 15 immediately after the knife has been introduced into the snake so as to push the stick 4 of predetermined number of can ends away from the body 5 of the snake (see FIG. 3). The rearmost end of the stick 4 is taken beyond the position of the finger 22. The piston 19 is then retracted, moving the head back towards the body 5. The solenoid controlling the knife 14 may be de-energised to allow the knife to be spring-biased back to its retracted position either before the head moves backwards or whilst the head moves backwards.

The knife 14 is retracted before the head returns to its initial rearward position so as to avoid it catching the can ends 2 of the body which will have advanced forwards a little. As the sensor of the head moves backwards with the head over the leading few can ends of the body it counts them. Thus the count of the next stick can begin even before the head has been returned fully to its rearward position.

When the piston 19 returns to its retracted position the rotation means 21 is operated by the controller 17 to move the finger 22 in behind the rearmost can end of the stick 4. The longitudinal arm-moving means 23 is then operated by the controller to move the finger 22, and hence stick 4, further from the main body 5 (see FIG. 4). The stick can be moved to a processing station where the predetermined number of can ends can have a subsequent operation performed on them. For example they could be packaged. The rotation means 21 and the arm-moving means 23 return to their positions of FIG. 1 before the head-moving piston and cylinder assembly 15 operates again.

It will be appreciated that the stick-moving assembly 16 could comprise a circulating drive, such as a belt, with appropriately mounted means for engaging the stick.

The structure and operation of the sensor unit 13 is shown in FIGS. 5 to 9. The unit 13 comprises a casing 30 having an access port 31 for electrical connections, an infra red filter 32 and an infra red LED emitter 33, a lens 34, and a pair of slightly offset infra red photo transistor detectors 35 and 36. The LED emitter 33 is angled at about 60 degrees to the direction in which the two detectors 35 and 36 are facing and is right next to the filter 32. The two detectors 35 and 36 are at one end of a tunnel or tube 37 which has rough walls (for example screw-threaded) so as to prevent the walls acting as a mirror. The lens 34 is at the forward end of the tunnel. The lens is protected by a pair of fins provided on the casing. The fins may also serve to guide the can ends if they jump up due to vibration.

Figure 7:
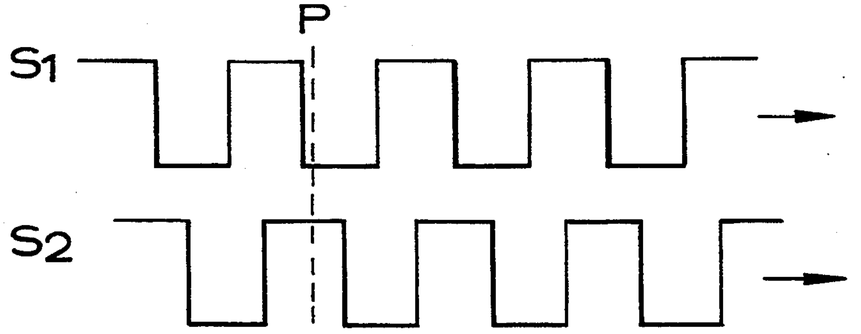
FIG. 7 shows schematically the relationship between signal from two detectors of the sensor of FIG. 5.
Figure 8:
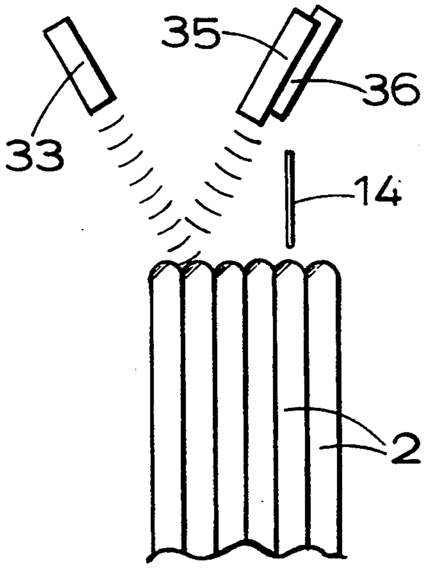
FIGS. 8 and 9 illustrate a principle of operation of the sensor of FIG. 5.
Figure 9:
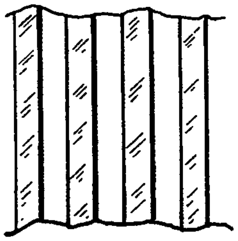

FIGS. 8 and 9 show the effect of illuminating the peripheral edges of the can ends obliquely. One side of the "hills and valleys" defined by the curved adjacent peripheral edges of the can ends of the snake face the emitter and are in "bright" light, and the other side of the hills and valleys are in shadow. Thus each of the detectors see a pattern of light and dark bands (signals of higher and lower intensity) as schematically illustrated in FIG. 9. The detectors 35 and 36 see slightly different signals from each other due to any one hill or valley because they are slightly offset longitudinally of the snake. Thus their detection signals are out of phase with each other. The arrangement of their longitudinal offset (in the longitudinal direction of the snake) and the width (longitudinal length) of the peripheral edge regions of the can ends is such that the signals S1 and S2 from the two detectors are 90 degrees out of phase—they are in quadrature. This is shown in FIG. 7.

The use of two detectors producing quadrature signals improves the accuracy of the detector unit. With some detector units a single can end can pass forwards and backwards in front of a detector several times (for example if it is vibrating when the snake is temporarily stationary). This can cause the same can end to be counted several times. By having two signals and comparing how they change relative to each other the controller 17 can distinguish between forward movement of a can end past the sensor and backward movement of a can end past the sensor and can add to or subtract from the count appropriately. For example, consider the sensor acting at point P of FIG. 7. If the can ends are moving forward S1 will shortly see a rising signal at the same time as the signal from S2 is high. The controller identifies this as +1 can end. If the can ends were to move backwards the controller would see S2 falling whilst S1 is low, which is not what it next expected to see if the can ends were still moving forward (S2 falling rapidly with S1 high). The controller thus identifies that sequence of signals as a rearward movement, or −1 can end.

The controller can also identify when a valley between two adjacent can ends is lined up with the knife 14 by looking at the signals S1 and S2 and knowing the relative longitudinal positions of the knife and the detectors 35 and 36.

Figure 5:
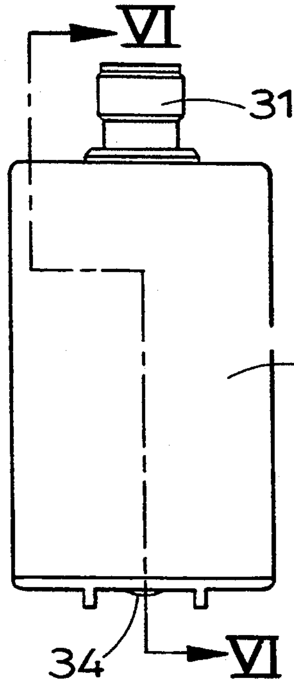
FIG. 5 shows a side view of a sensor used in the apparatus of FIGS. 1 to 4.
Figure 6:
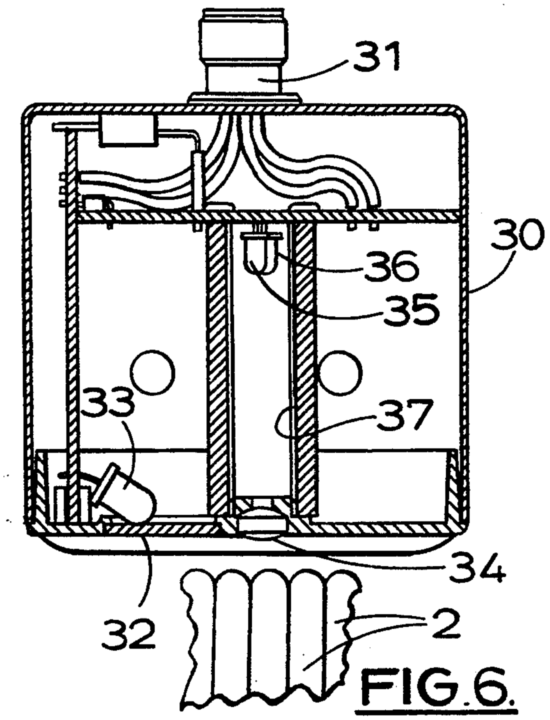
FIG. 6 is a cross-section along line VI—VI of FIG. 5.
Figure 11:
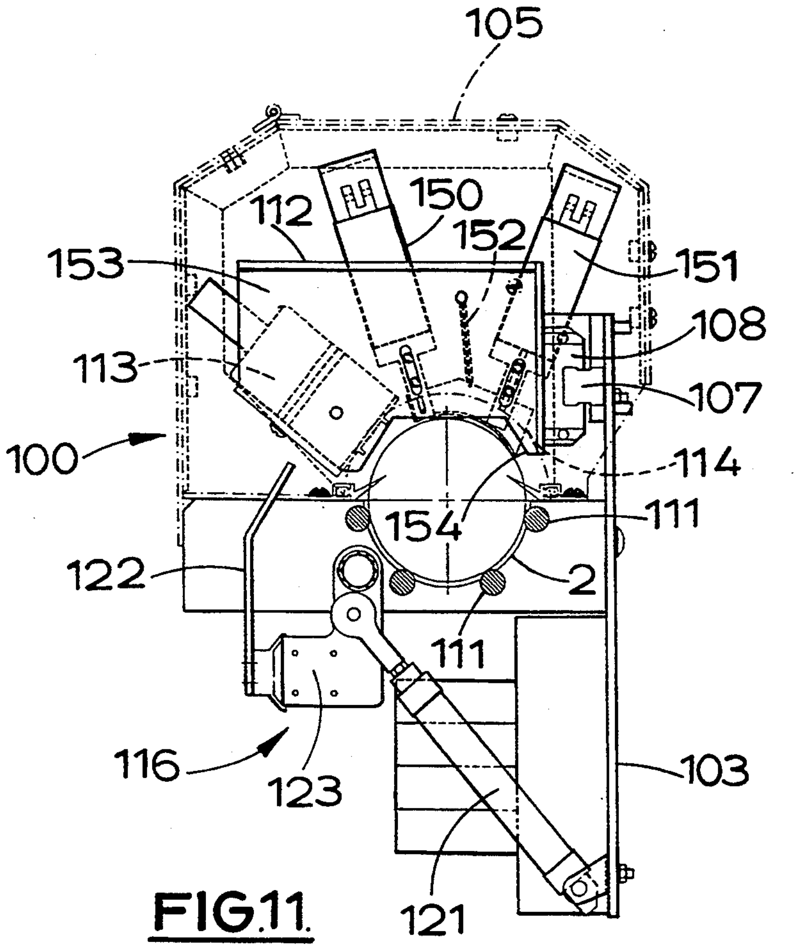
FIG. 11 is a schematic cross-section through the end splitter of FIG. 10.
Figure 10:
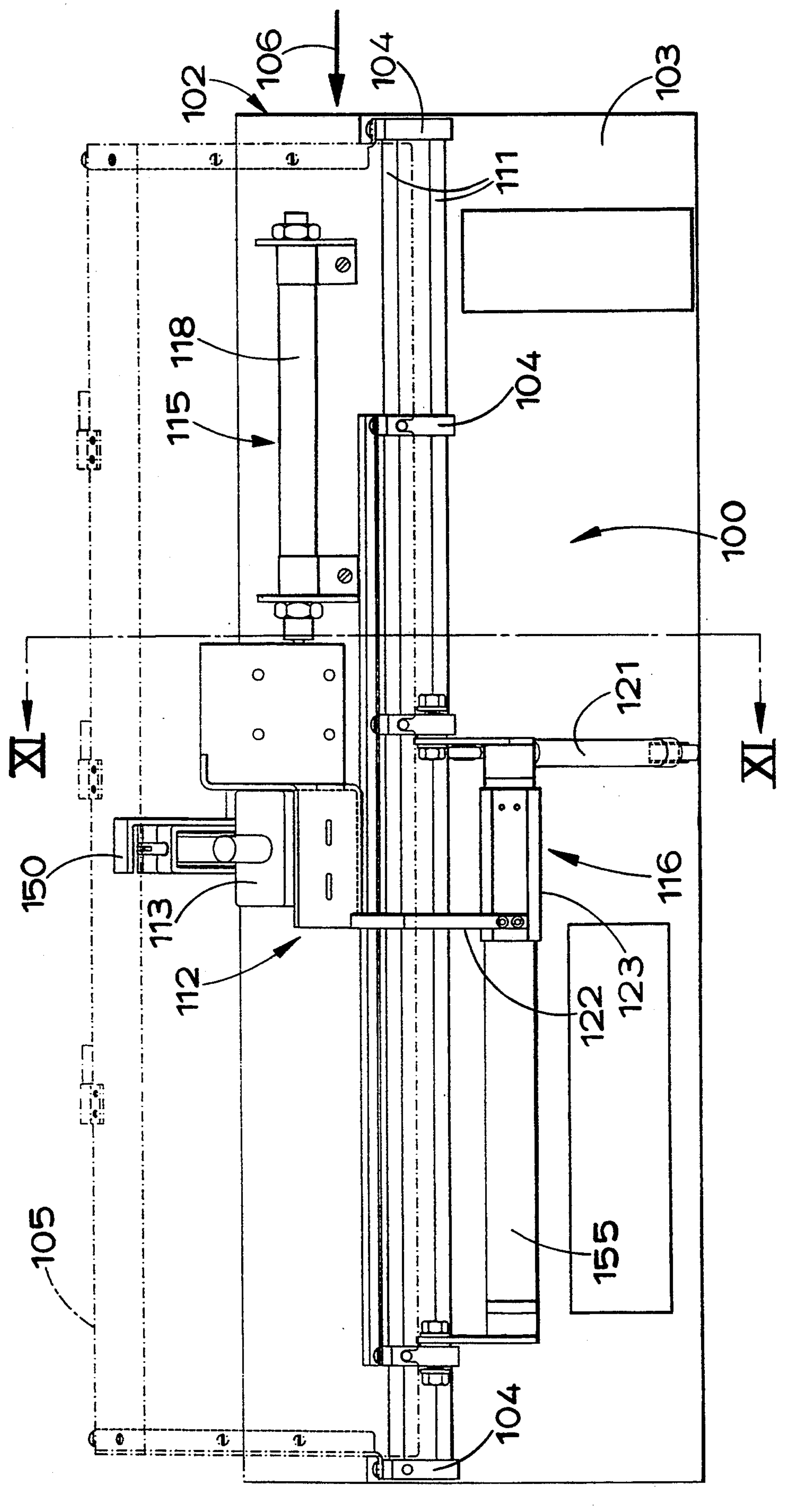
FIG. 10 is a side view of a production version of an end splitter.

FIGS. 10 and 11 show a production version of an end splitter 100 which is similar in many ways to the schematic system of FIGS. 1 to 4 and which uses the sensor unit of FIGS. 5 and 6 in the manner of FIGS. 7 to 9. Similar components have been given similar reference numerals.

The end splitter 100 has a guideway 101 for can ends 2 comprising rods 111 mounted on a support structure 102. The support structure has a back, or mounting, plate 103 and transverse elements 104. A protective cover 105 is mounted on the back plate 103 and covers the end splitter operating components. Can ends are fed into the end splitter in the direction of arrow 106. The back plate 103 also has a longitudinally extending guide member 107 mounted on it which co-operates with a complementary guide formation 108 provided on a head 112 (see FIG. 11). The head is guided for sliding movement in a longitudinal direction by the co-operation between the guide member and the guide formation.

The head 112 has a sensor 113 which has the structure and operation shown in FIG. 6. The head also carries a knife 114 which has a substantial arcuate extent and is attached at one end to a first solenoid 150 and at its other end to a second solenoid 151. A knife return spring 152 is also provided on the head. The head has side walls 153 provided with notches 154 at their lower edge to allow the can ends 2 to pass. A head-moving piston and cylinder assembly 115 having a cylinder 118 is provided mounted on the plate 103 and acts on the head. The blade of the knife extends through about 90 degrees. Such a blade does not experience as much twisting torque when the stick is driven away from the main snake body as would a blade of small angular extent.

A stick-moving assembly 116 is also mounted on the back plate 103 and comprises a piston and cylinder assembly 121 adapted to move a finger 122 angularly relative to the back plate 103, and longitudinal drive means 123 adapted to move the finger 122 longitudinally along an arm 155 which extends longitudinally of the splitter.

The end splitter is of course controlled by an electronic controller (not shown).

The operation of the end splitter 100 is very similar to that described with reference to FIGS. 1 to 9, except that there are two solenoids which act on the same knife. These are actuated in sequence so that a first edge of the knife is pushed between a first region of the junction between two adjacent can ends and then a second, angularly spaced, region of the knife blade is pushed in.

For the avoidance of doubt the sequence of operation of the end splitter is:

1. Ends pass under the sensor until the required count is reached.

2. The electronics of the controller wait for a synchronisation signal to indicate that the blade is in line with a "valley".

3. A first solenoid (say solenoid 151) is energised at high voltage for a predetermined (short) time.

4. The first solenoid is switched to a holding voltage and the second solenoid is energised at a high voltage for a predetermined time.

5. The second solenoid is switched to a holding voltage and the first head-pushing cylinder 118 operates.

6. The cylinder 118 reaches the end of its travel which is sensed and the controller de-energises the solenoids and the movement of the cylinder is reversed.

7. The first push cylinder 118 reaches its retracted position which is sensed and the second push rotation cylinder 121 is operated by the controller to move the finger into the projected area of the can ends.

8. The second push drive cylinder 123 operates.

9. When the controller senses that the drive cylinder 123 has reached the full extent of its travel the second push rotation cylinder retracts, moving the finger back out of the way.

10. The second push cylinder is retracted by the controller.

11. The second push cylinder reaches its retracted position and the unit waits for the required count to be reached again.

The end splitter has a display panel (not shown) where faults are indicated. For example the controller monitors a knife fault (whether the knife reaches its fully extended position or not), a stroke fault (whether the first push cylinder, cylinder 118, reaches its fully extended position or not), and a stick or clear fault (whether the finger reaches its fully advanced position and retracts back to its fully rearward position, and rotates out of the way). If any of the faults are found the end splitter stops, the controller stops the feed of can ends to the end splitter, and a warning is given indicative of the fault.

The user can, of course, input into the controller the desired number of can ends in a stick. The controller counts and can output information on the total number of can ends passed beneath the sensor, and the total number of bagged sticks prepared in any one session.

In the arrangement of FIGS. 8 the emitted signal produced by the emitter 33 and the reflected signal received by the receiver or receivers 35, 36 are shown as essentially collinated beams. This is only a schematic representation and in reality as the emitted signal propagates from the receiver or receivers along an axis of propagation, the signal will diverge away from the axis of propagation. Furthermore the receivers are capable of receiving signals which approach the receiver within a detection cone, the apex of which is coincident with the receiver itself.

Of course, the axis of the detection cone and the axis of propagation from the emitter may be parallel and not disposed at an angle as indicated in FIG. 8 Accordingly the invention is not restricted to the arrangement shown in FIG. 8. This is because the beam is divergent and the receiver can receive within a detection cone. Any particular ray reflected from the surface of the stack that is detected will, of course, be detected at the end of a ray path which is inclined to the ray path from the emitter to the surface taken by that ray. However for optimum sensitivity the "angled" arrangement of the emitter and detector is preferred.

Other variations of FIG. 8 conceived to be within the scope of the invention are to provide the detectors at a point on a line normal to the central axis of the stack such that the axis of the detection cone is parallel to the line normal to the central axis and the emitter is inclined such that the axis of propagation is parallel to a line inclined at an oblique angle to the line normal to the central axis. Of course the positions of the receiver or receivers and the emitter may be swapped to produce an equivalent effect.

I claim:

1. Apparatus for counting can ends or the like arranged side-by-side in a stack and moving in the direction of the axis of the stack comprising:

a source of light for illuminating the edges of said can ends at an oblique angle relative to said axis;

first and second detectors receiving light from said source reflected from said can ends, and characterized in that said detectors are slightly offset from one another along said axis and in relation to the thickness of the can ends such that the signals of said detectors are out of phase to provide a count of the number of can ends passing beneath said detectors as well as the direction in which each can end passes, whereby a total count of can ends passing beneath said detectors in a single direction is obtained by adding the number of can ends detected as passing in one axial direction and subtracting the number of can ends detected as passing in the other axial direction.

2. The apparatus of claim 1 wherein said oblique angle is formed by said axis of said stack and a line extending between said light source and the location at which light reflected from said can ends is received by said detectors, said oblique angle being in the range of 40–80°.

3. The apparatus of claim 1 characterized in that the axial spacing of said detectors in relation to the thickness of an individual can end is such that the output signals of said detectors, in detecting each can end passing thereunder, are out of phase by approximately 90°.

4. The apparatus of claim 3 wherein said first detector is located upstream in the normal direction of movement of said can ends relative to said second detector and the output signals of said detectors are binary signals having a relatively high state and a relatively low state, whereby the direction of movement of said can ends may be determined by sensing that said second detector is in said first state at the time said first detector changes to said first state, and conversely, if the can ends are moving in an opposite axial direction, said first detector is in said second state when said second sensor changes to said second state.

5. The apparatus of claim 1 further comprising a light guideway extending generally in a direction radial of said axis and characterized in having an internal surface of low reflectivity, and means for mounting said first and second sensors at a distal end of said guideway remote from the edges of said can ends, said guideway defining an aperture adjacent said can ends for receiving light reflected from the edges of said can ends passing therebeneath.

6. The apparatus of claim 5 further including a lens mounted in said aperture of said guideway.

7. The apparatus of claim 6 wherein said light guideway is characterized in having a generally cylindrical inner wall provided with means for reducing the ability of ambient light entering said lens to be transmitted axially of said guideway.

* * * * *